(12) United States Patent
Thompson et al.

(10) Patent No.: US 12,410,682 B2
(45) Date of Patent: Sep. 9, 2025

(54) SAFETY VALVE, METHOD, AND SYSTEM

(71) Applicant: Baker Hughes Oilfield Operations LLC, Houston, TX (US)

(72) Inventors: Grant Thompson, Tulsa, OK (US); Wade Miller, Broken Arrow, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/654,734

(22) Filed: May 3, 2024

(65) Prior Publication Data

US 2025/0154852 A1 May 15, 2025

Related U.S. Application Data

(63) Continuation-in-part of application No. 18/508,802, filed on Nov. 14, 2023.

(51) Int. Cl.
*E21B 34/10* (2006.01)
*E21B 34/06* (2006.01)
*F16K 17/16* (2006.01)

(52) U.S. Cl.
CPC .......... *E21B 34/106* (2013.01); *E21B 34/063* (2013.01); *F16K 17/16* (2013.01); *E21B 2200/05* (2020.05)

(58) Field of Classification Search
CPC ...... E21B 34/106; E21B 34/063; E21B 34/06; E21B 34/10; E21B 34/105; E21B 2200/05; F16K 17/162; F16K 17/16; F16K 17/14
See application file for complete search history.

(56) References Cited

U.S. PATENT DOCUMENTS 4,782,895 A 11/1988 Jacob et al.
5,465,786 A 11/1995 Akkerman
(Continued)

FOREIGN PATENT DOCUMENTS

EP 2129866 B1 9/2014
JP 2014512495 A 5/2014
(Continued)

OTHER PUBLICATIONS

Notification of Transmittal of the International Search Report and the Written Opinion of the International Searching Authority, or the Declaration; PCT/US2024/055885; Mail date: Feb. 2, 210253 pages.
(Continued)

*Primary Examiner* — George S Gray
(74) *Attorney, Agent, or Firm* — Baker Hughes Patent Organization (57) ABSTRACT

An insert safety valve, including a housing, a flow tube in the housing, a flapper responsive to positions of the flow tube, an atmospheric chamber in the housing, an element upon the housing, a selectively openable arrangement to prevent or allow pressure communication between the chamber and an environment outside the housing, the arrangement including an opener responsive to movement of the element to selectively open the openable arrangement. A borehole system, including a preexisting downhole structure having a control line, an insert safety valve, in the preexisting downhole structure, the insert safety valve operable with the control line. A method for controlling a wellbore, including running an insert safety valve while preventing fluid communication with an atmospheric chamber of the safety valve, moving the opener, and enabling fluid communication with the atmospheric chamber.

20 Claims, 11 Drawing Sheets

(56) References Cited

U.S. PATENT DOCUMENTS

| | | | | |
|---|---|---|---|---|
| 6,253,843 | B1* | 7/2001 | Rawson | E21B 34/066 166/332.8 |
| 6,513,594 | B1* | 2/2003 | McCalvin | E21B 34/10 166/332.3 |
| 6,607,037 | B2* | 8/2003 | Thompson | E21B 34/10 166/334.1 |
| 8,511,374 | B2* | 8/2013 | Scott | E21B 34/106 166/381 |
| 10,745,997 | B2 | 8/2020 | Burris et al. | |
| 11,015,418 | B2 | 5/2021 | Burris et al. | |
| 11,111,740 | B2 | 9/2021 | Garr et al. | |
| 11,293,265 | B2 | 4/2022 | Burris et al. | |
| 2003/0019629 | A1 | 1/2003 | Thompson | |
| 2008/0128137 | A1* | 6/2008 | Anderson | E21B 34/101 166/321 |
| 2008/0230231 | A1* | 9/2008 | Bolding | E21B 43/25 166/73 |
| 2010/0025045 | A1* | 2/2010 | Lake | E21B 34/066 166/373 |
| 2013/0032355 | A1 | 2/2013 | Scott et al. | |
| 2015/0226030 | A1* | 8/2015 | Mackenzie | E21B 34/066 166/373 |
| 2015/0275620 | A1 | 10/2015 | Scott et al. | |
| 2015/0369005 | A1* | 12/2015 | Vick, Jr. | E21B 34/10 166/243 |
| 2016/0138365 | A1* | 5/2016 | Vick, Jr | E21B 34/10 |
| 2018/0202261 | A1* | 7/2018 | Scott | E21B 34/16 |
| 2018/0340397 | A1* | 11/2018 | Lake | E21B 34/066 |
| 2018/0355698 | A1* | 12/2018 | Williamson | E21B 34/16 |
| 2019/0376367 | A1* | 12/2019 | Burris | E21B 34/14 |
| 2020/0048988 | A1* | 2/2020 | Vick, Jr. | E21B 34/101 |
| 2021/0108487 | A1* | 4/2021 | Vick, Jr. | F16K 1/2007 |
| 2022/0341285 | A1* | 10/2022 | Werkheiser | E21B 34/08 |
| 2025/0154850 | A1 | 5/2025 | Thompson | |

FOREIGN PATENT DOCUMENTS

| | | | |
|---|---|---|---|
| WO | 2017048265 | A1 | 3/2017 |
| WO | 2017204804 | A1 | 11/2017 |

OTHER PUBLICATIONS

The Lee Company; Product Information Sheet—Lee Burst-Sert Rupture Disc; Aug. 2021; 2 pages; https://www.theleeco.com/uploads/2021/11/ProductInformationSheet2021-08-LeeBurst-SertRuptureDisc.pdf.

Notification of Transmittal of the International Search Report and the Written Opinion of the International Searching Authority, or the Declaration; PCT/US2024/055023; Mail Date: Feb. 20, 2025; 13 pages.

* cited by examiner

SAFETY VALVE, METHOD, AND SYSTEM

CROSS REFERENCE TO RELATED APPLICATIONS

This application is a continuation in part of U.S. application Ser. No. 18/508,802 filed Nov. 14, 2023, the disclosure of which is incorporated by reference herein in its entirety.

BACKGROUND

In the resource recovery and fluid sequestration industries safety valves are often employed for well control. Long service lives are paramount and yet sometimes the life of a safety valve is insufficient for the duty asked of it. In such conditions, insert safety valves are employed to substitute for the function of the previous safety valve. Axiomatically, disposing a replacement valve inside a previous valve reduces available inside diameter, which is generally contrary to desirability. Since insert valves are less expensive than complete workovers, they are not likely to disappear and hence new technologies with enhanced functionality are always desirable.

SUMMARY

An embodiment of an insert safety valve, including a housing, an element disposed upon the housing, a flow tube movably disposed within the housing, a flapper articulated to the housing and responsive to positions of the flow tube relative to the housing, an atmospheric chamber disposed within the housing, a selectively openable arrangement, an opener disposed to selectively open the openable arrangement to allow pressure communication between the atmospheric chamber and an environment outside of the housing, the opener including an opener being responsive to movement of the element on the housing.

An embodiment of a borehole system, including a preexisting downhole structure having a control line, an insert safety valve, disposed within the preexisting downhole structure, the insert safety valve configured to operate based upon input from the control line.

An embodiment of a method for controlling a wellbore, including running the insert safety valve to a location in a wellbore, preventing fluid communication with the atmospheric chamber of the safety valve during running, landing the insert safety valve, moving the opener, and enabling fluid communication with the atmospheric chamber.

An embodiment of a wellbore system, including a borehole in a subsurface formation, a string in the borehole, and an insert safety valve, disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
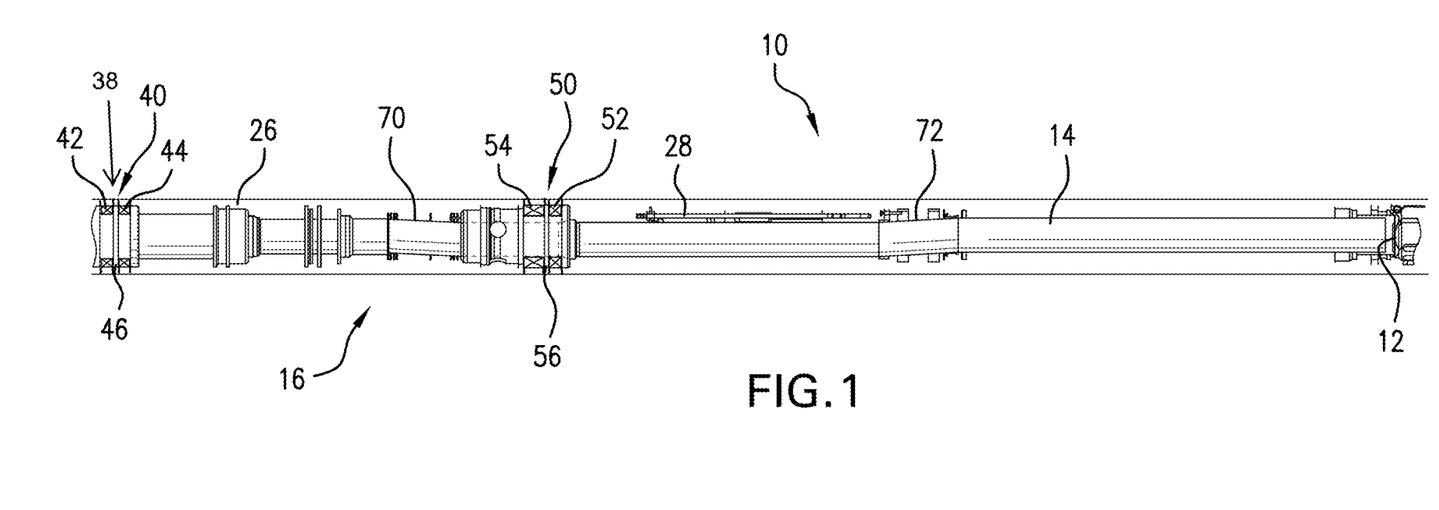
FIG. 1 is a section view of an insert valve as disclosed herein.
Figure 2:
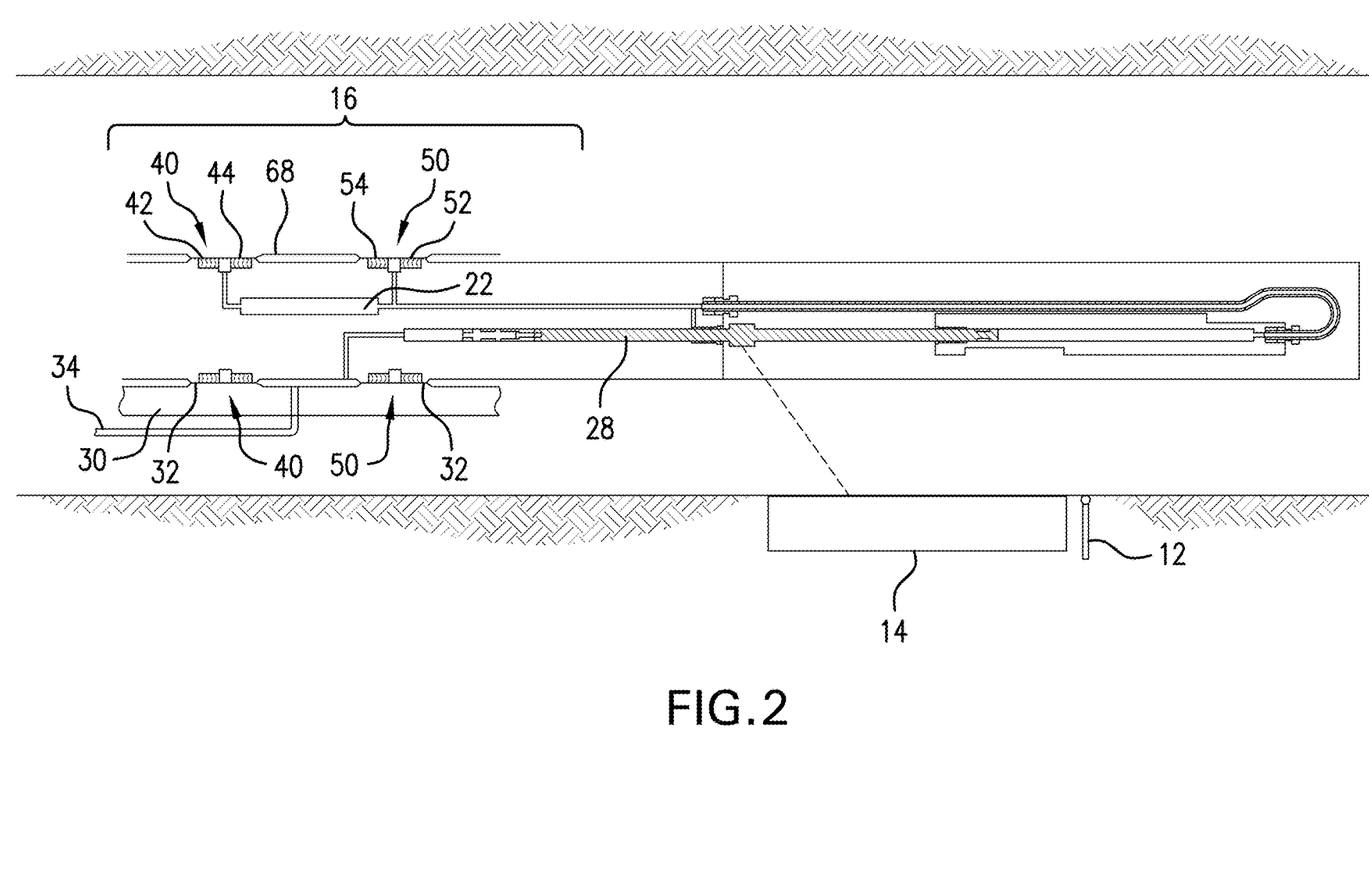
FIG. 2 is a schematic view illustrating the control system of the insert valve of FIG. 1.

Referring to FIGS. 1 and 2, a section view of an insert safety valve 10 is illustrated. Insert valve 10 includes a flapper 12, a flow tube 14, a control portion 16 configured to employ control line pressure from a preexisting control line 34 (see FIG. 2) to operate the insert valve 10. The insert valve 10 further includes an atmospheric chamber 22 (see FIG. 2) to reduce actuation pressures required in ways known to the art. The chamber 22, in order to function properly must be maintained free of wellbore fluid during the running process. For this purpose, a selectively openable arrangement 38 that may be configured as a valve 46/56 is disposed in a housing 26 of the insert valve 10 in fluid communication with the atmospheric chamber 22 and between chamber 22 and tubing pressure outside of the housing 26. Atmospheric chamber 22 is also tasked with promoting a failsafe condition of the insert valve by causing the insert valve 10 to be unopenable if closed or to close if open in the event that pressure accesses the atmospheric chamber 22 other than simply by compressing the volume of the chamber 22 due to movement of a flow tube actuating piston 28. Such pressure access is a result of fluid entering the chamber 22 from either a tubing pressure source or a control pressure source.

The insert valve 10 is run into the borehole to a preexisting downhole structure 30 (see FIG. 2). In most cases, the preexisting downhole structure 30 is configured as a Tubing Retrievable Safety Valve or a Landing Nipple, and it includes a seal bore 32 therein to accept and seal the insert valve 10 therein. The downhole structure 30 will also have a provision for allowing access to the preexisting control line pressure. A preexisting control line 34 was in place to supply control pressure to the preexisting downhole structure 30. Various constructions and methods exist for accessing the original control line pressure and are known to the art.

Figure 3:
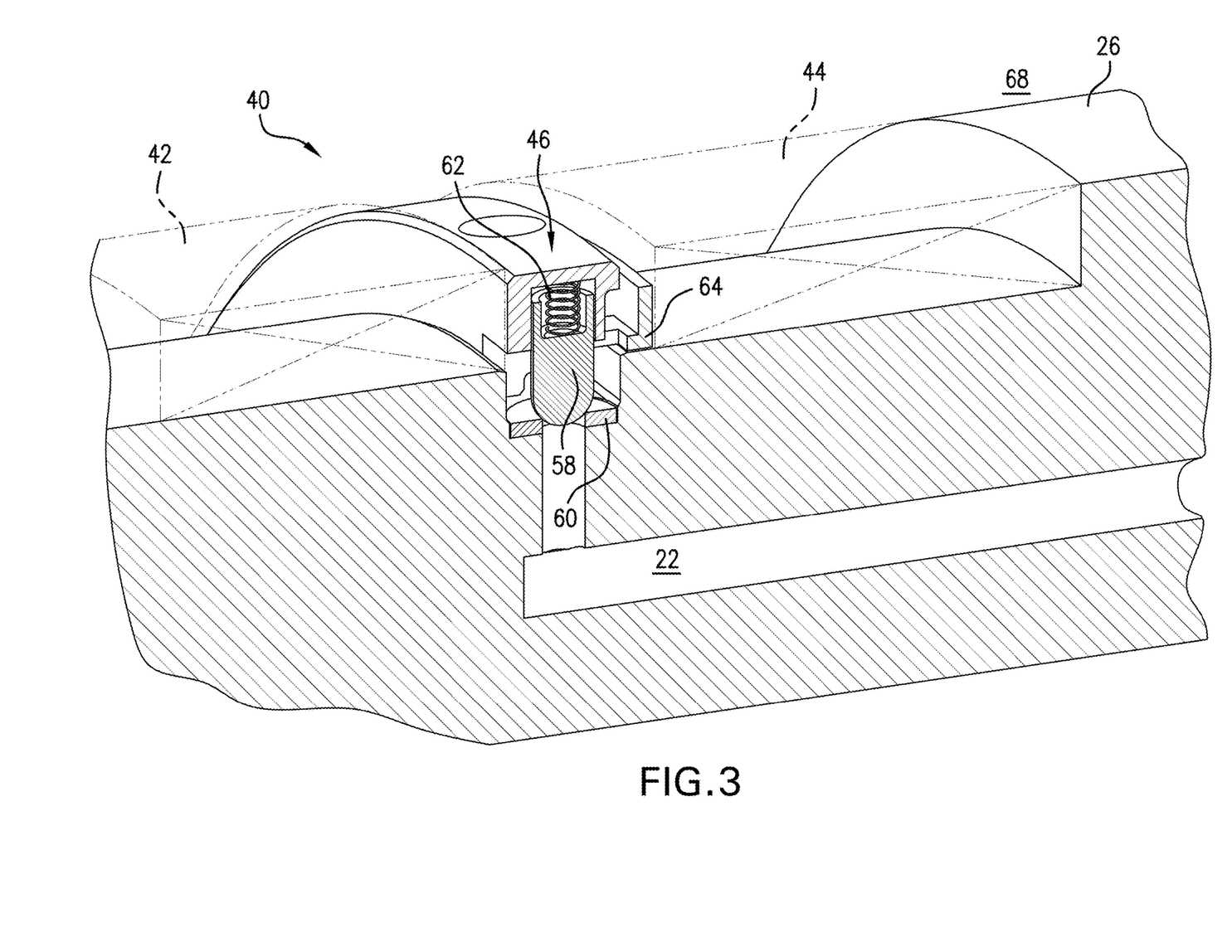
FIG. 3 is a perspective view of a selectively openable arrangement fluidically associated with an atmospheric chamber of the valve of FIG. 1, the openable arrangement in a closed position.
Figure 4:
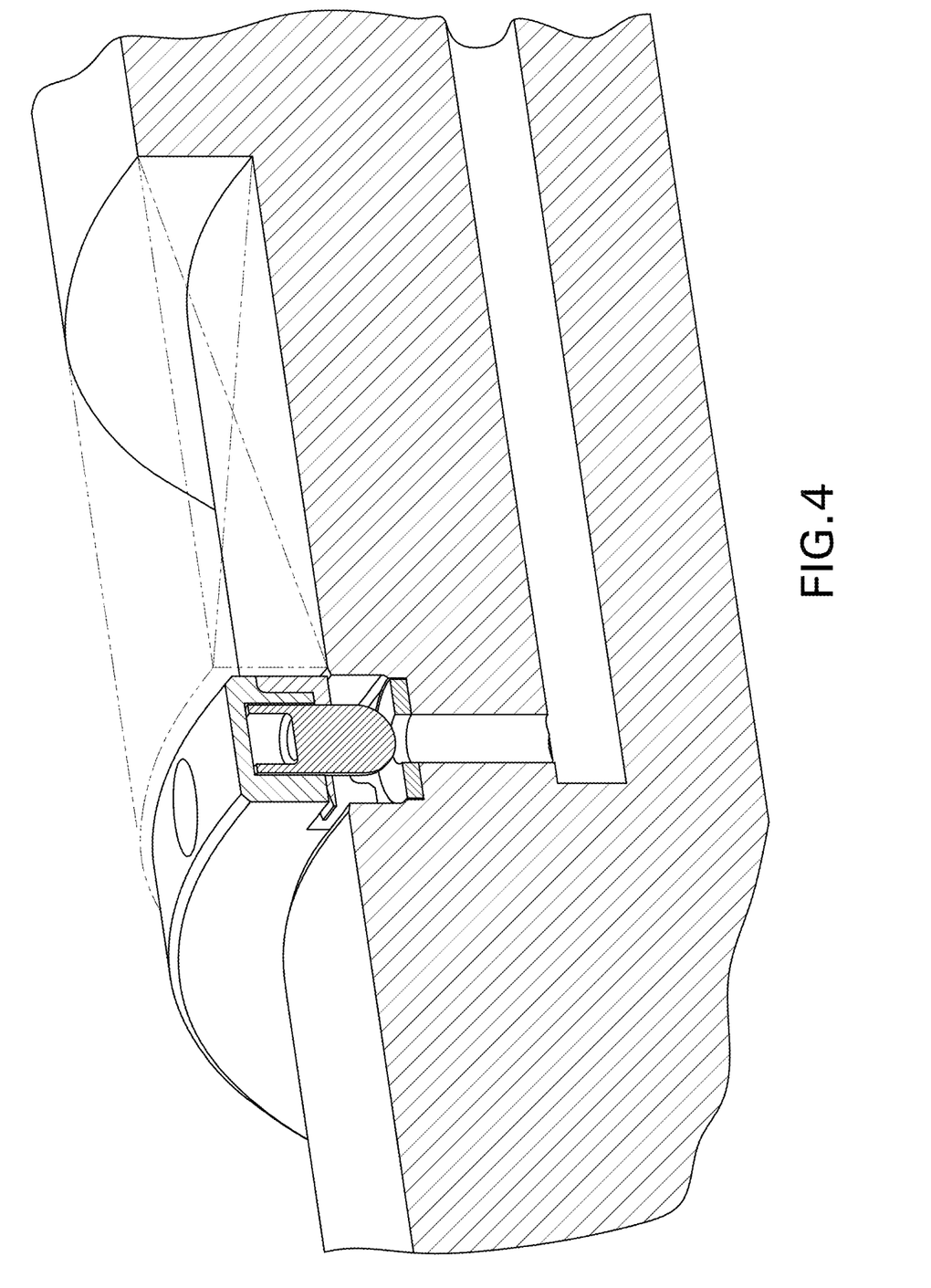
FIG. 4 is a perspective view of the selectively openable arrangement of FIG. 3, the openable arrangement in an open position.
Figure 5:
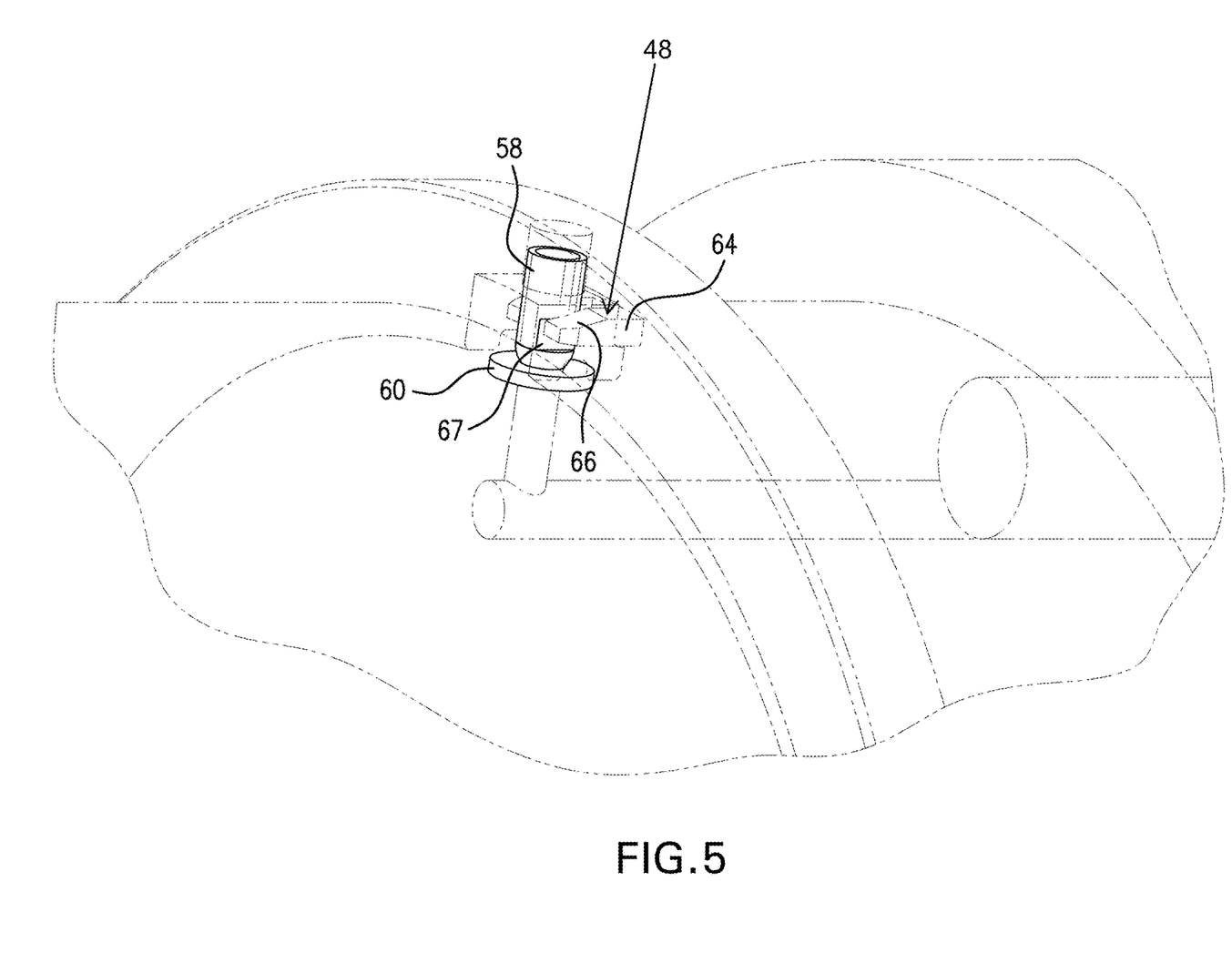
FIG. 5 is a perspective view of the openable arrangement 46 and related components.

Referring to FIGS. 2, 3-5 for specifics and FIG. 1 for location, insert valve 10 includes a first packing arrangement 40, having a tubing pressure side element 42 and a control pressure side element 44. A selectively openable arrangement (38) that may be configured as a valve 46, in an embodiment, is disposed between the element 42 and element 44. The insert valve 10 also may comprise a second packing arrangement 50 having a tubing pressure side element 52 and a control pressure side element 54. There also may be a second selectively openable valve 56 disposed between element 52 and element 54. Openable valves 46 and/or 56 are configured with a valve member 58, a valve seat 60, a biaser 62, and an opener 48 that may be configured as an unseat member 64 in some embodiments. The valve members 58 are initially seated in the valve seats 60 and prevent fluidic contact between the atmospheric chamber 22 and the environment outside of the insert valve 10. Once the insert valve 10 is landed in the preexisting downhole structure 30 however, the openable valves 46/56 need to be opened to support function of the insert valve 10. Referring to FIG. 2, the control line 34, having been accessed by known methods, is available to provide pressure to a volume 68 between the insert valve 10 and the preexisting downhole structure 30, and bounded by the first and second packing arrangements 40 and 50, respectively. Pressure applied to the volume 68 is control pressure that is controlled from a remote source by surface personnel or programmable controller. It is this pressure that is used to open the openable valves 46/56 and also to actuate the valve 10. Accordingly, the valves 46/56 remain closed and protective of the chamber 22 until a decision is taken to open them through the application of pressure in the control line 34. Pressurizing volume 68 causes one or both of the control side elements 44 and 54 to be moved along the housing 26 toward the unseat member 64. In FIGS. 3 and 4, only valve 46 is illustrated with surrounding structure. Valve 56 is a mirror image and so it need not be detailed. Focusing on FIGS. 3 and 4, the valve member 58 is seated on seat 60 and thereby allows no fluid communication between the atmospheric chamber 22 (fluidically the chamber 22 is all of the volume behind the valve member 58) and the environment outside of the housing 26. Upon the volume 68 being pressurized, element 44 is pushed leftwardly of the figure toward the valve 46. Comparing FIGS. 3 and 4, it will be appreciated that the valve member 58 and the unseat member 64 have changed position. The element 44 has pushed the unseat member 64 toward the valve member 58. In the position of FIG. 4, the unseat member 64 physically lifts the valve member 58 off the seat 60. This can be seen in FIG. 4. Referring to FIG. 5, the unseat member 64 can be seen to exhibit a wedge 66 that engages a recess 67 of the valve member 58. The urging of the unseat member 64 closer to the valve member 58 causes the valve member 58 to climb the wedge 67 and come off the seat 60. Once off the seat, the chamber 22 is fluidly communicated to the space between element 42 and 44 bounded by the seal bore 32. In this condition, the insert valve 10 may be operated via pressure from the control line. However, if packing 40 or 50 leaks in either direction (from the control side pressure or from the tubing pressure side) fluid will infiltrate the chamber 22 and either cause the valve 10 to close or to prevent the opening of valve 10. In either case, a leak past packing 40 or packing 50 in either direction (i.e., from the tubing pressure side or from the control pressure side) will allow fluid to move into the chamber 22 and thereby cause a fail-safe condition. The pathways implicated may be appreciated in schematic form in FIG. 2, which includes the components discussed above and also illustrates the flow tube piston 28 that is to be actuated by the control line pressure in volume 68 to force the flow tube 14 to move into contact with the flapper 12 (both illustrated schematically in this figure). The piston 28 is fitted with an upper, middle, and lower dynamic seal 74, 76, & 78 respectively. The upper dynamic seal 74 is configured to seal against control line pressure on one side and atmospheric pressure on the opposite side. The middle dynamic seal 76 and lower dynamic seal 78 are equivalent in size and may be configured as rod seals with wellbore pressure acting on one side of each seal and atmospheric pressure acting on the opposite side of each seal. With the middle and lower dynamic seals 76 & 78 being equally sized and located on opposite sides of the piston 28, a pressure balanced condition is achieved with wellbore pressure acting in equal and opposite directions about the piston. This balanced condition makes the insert valve 10 insensitive to wellbore pressure and thus enables actuation at much lower hydraulic pressures in comparison to conventional subsurface safety valves. As with packing 40 and 50, a leak across dynamic seals 74, 76, and 78 will allow fluid to move into chamber 22 and thereby cause a failsafe condition. The entirety of the chamber 22 is further illustrated in FIG. 2 to establish the boundary of where atmospheric pressure shall reside to enable function of the insert valve 10.

In an embodiment hereof, the control portion 16 of the valve 10 requires more radial space in the housing 26 than a concentric bore for the flow tube 14 would support. Accordingly, insert valve 10 also includes an offset to the bore for the flow tube 14. In an embodiment, the offset is about 0.250 inch radially. This is illustrated in FIG. 1, where the deviation in the inside diameter of the valve 10 can be seen at deviation 70 and back at deviation 72. This provides the additional space needed in the now eccentric annular space of the housing 26 on one side of the housing.

Referring to FIGS. 6-10, two alternate embodiments for openable arrangements 38 are illustrated. Either of these alternate embodiments that are configured as penetrator configurations 80 or 82, may be substituted for openable valves 46 and/or 56. A housing 84 is similar to housing 26 in that a chamber 22 is retained (with the same function) but the housing 84 rather than having a valve seat 60 (as seen in FIG. 3), instead is closed in this location either by a rupture disk 86 or by a portion 88 of the housing that remains intact inboard of a recess 90 in the housing 84, which recess 90 is configured to accept a penetrator assembly 92. Portion 88 segregates recess 90 from chamber 22 until actuation of the penetrator assembly 92 is effected. Elements 94 and 96 are disposed upon the housing 84 in positions similar to those of the embodiments of FIGS. 2, 3, 4, and 5. Element 96 is similar to control side element 44 and functions in the same way with control line pressure causing the element 96 to move along the housing 84. Movement of element 96 causes a variant opener 48 to move. In the penetrator embodiments, the opener 48 is termed a mobilizer 98. Mobilizer 98 is an analogue of unseat member 64 that functions similarly to unseat member 64 (i.e. moves responsive to element movement) but by causing movement in the penetrator configurations in an opposite direction (radially inwardly of the housing 84). Specifically, the mobilizer causes movement of a penetrator 100 of the penetrator assembly 92 radially inwardly. Accordingly, movement of the mobilizer 98 will cause the penetrator 100 to load and then pierce the disk 86 or portion 88. Piercing the disk 86 or portion 88 will fluidically connect chamber 22 with a fluid source radially outwardly positioned of the housing 84.

Figure 6:
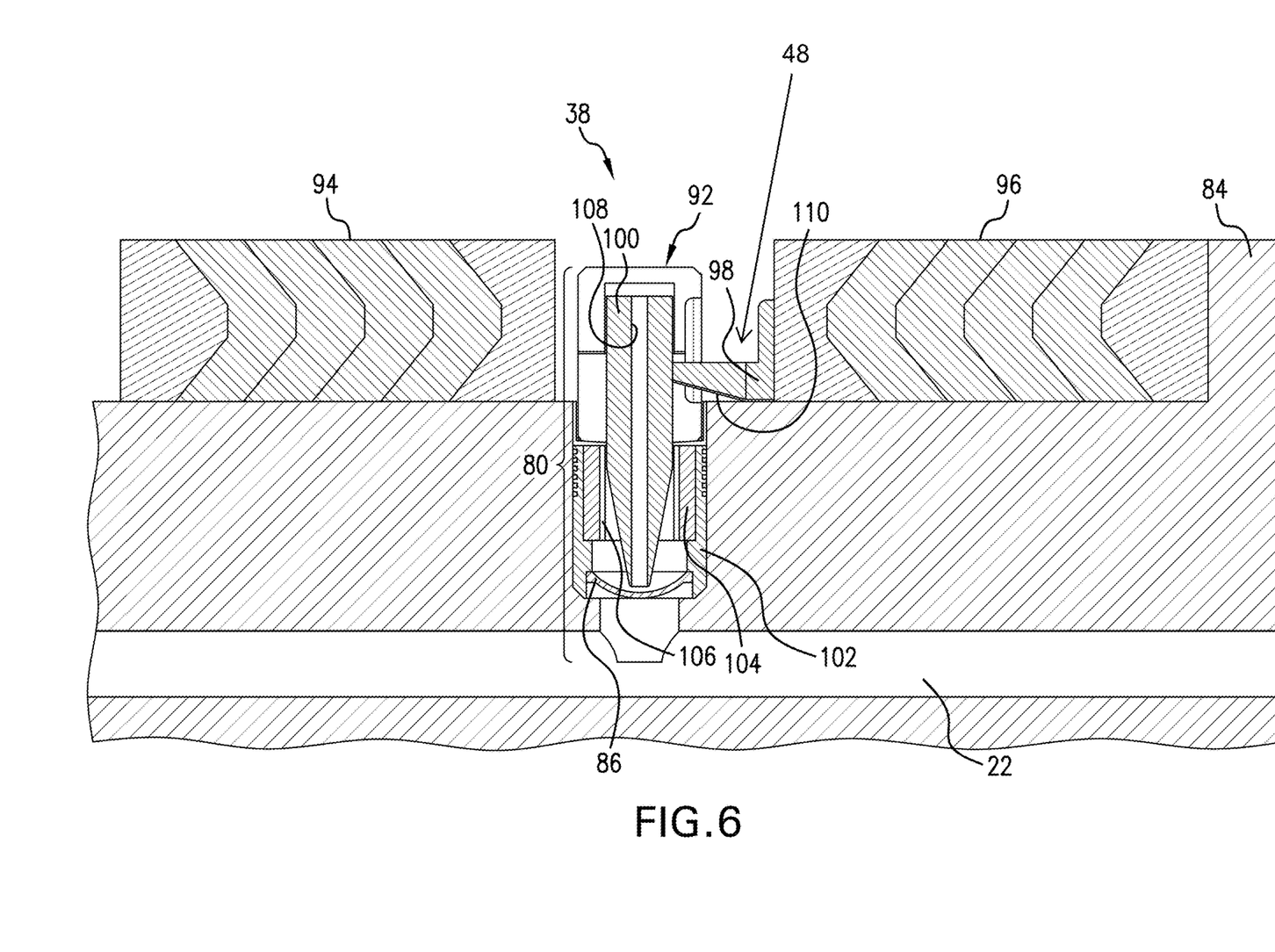
FIG. 6 is a sectional view of an alternate openable arrangement in a closed position.
Figure 7:
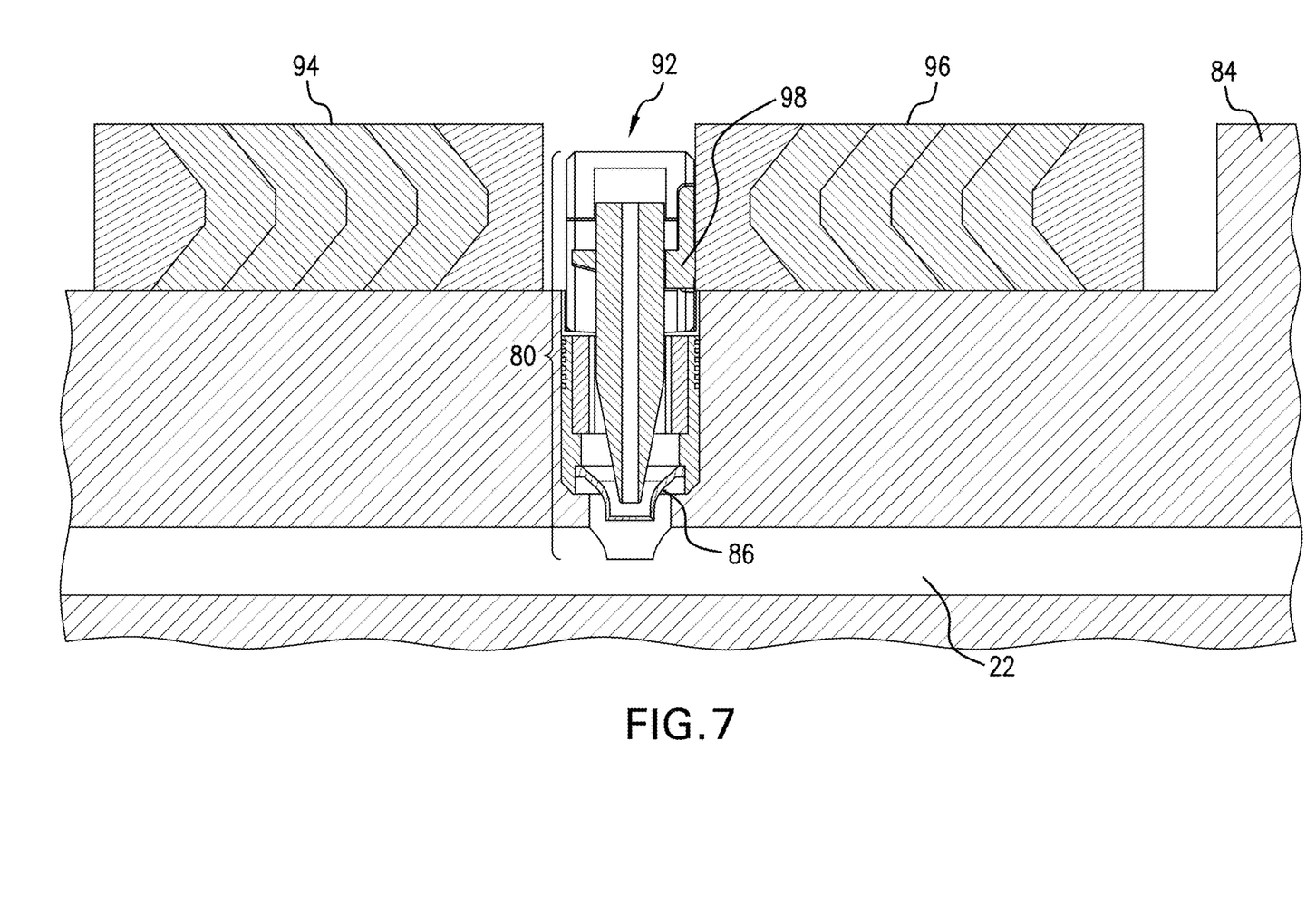
FIG. 7 is a sectional view of the FIG. 6 embodiment in an open position.

Referring specifically to FIGS. 6 and 7 (FIG. 6 in a preopened condition and FIG. 7 in an opened condition), penetrator configuration 80 comprises a penetrator assembly 92. Assembly 92 includes a disk cartridge 102 that supports the rupture disk 86 and also supports a bushing 104 for the penetrator 100. Disk cartridge 102 is sealed to housing 84 upon installation. Bushing 104 helps to ensure the penetrator 100 stays in an aligned position. It will be appreciated that the bushing 104 is illustrated with channels 106, and the penetrator (100) is illustrated with a center passage 108. These features are both for allowing fluid communication between chamber 22 and fluid radially outwardly disposed of housing 84, once the disk 86 is penetrated. In various embodiments, one or the other of these features may be used alone, while in other embodiments both may be used together.

Figure 10:
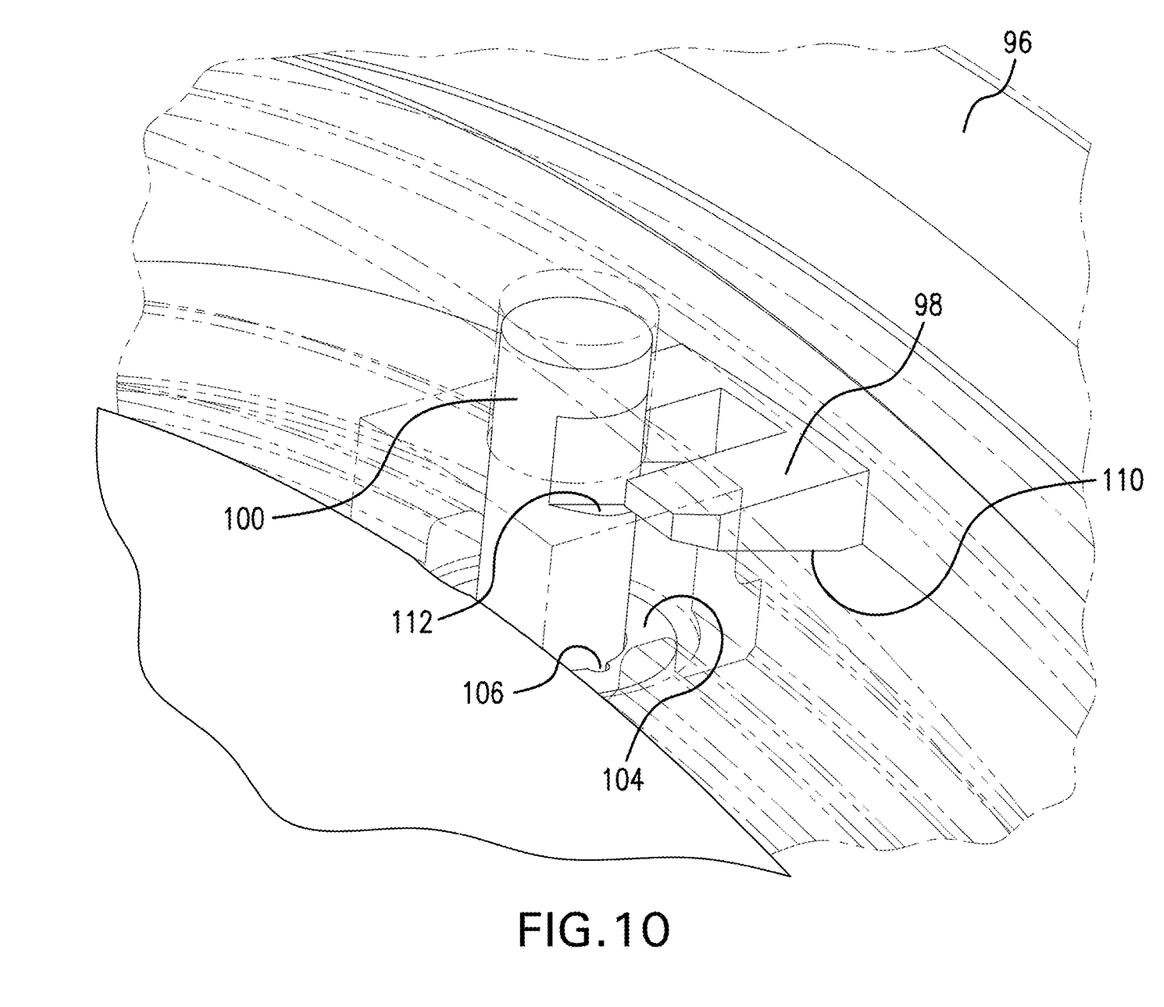
FIG. 10 is a perspective view illustrating a mobilizer for the embodiments of FIGS. 6-9.

It will be appreciated when comparing FIGS. 6 and 7 that element 96 has moved leftwardly of the Figure in FIG. 7. The cause of this movement is identical to that for above described embodiments. The mobilizer 98 is also moved leftwardly due to contact with the element 96. Referring to FIG. 10, it can be understood what occurs when the mobilizer 98 moves leftwardly of the figure. Specifically, mobilizer 98 includes an angled surface 110 that interacts with a shoulder 112 on the penetrator 100. As the mobilizer 98 moves closer to the penetrator 100, the shoulder 112 climbs the surface 110 thereby urging the penetrator into contact with and into rupture of the rupture disk 86 or portion 88.

Figure 8:
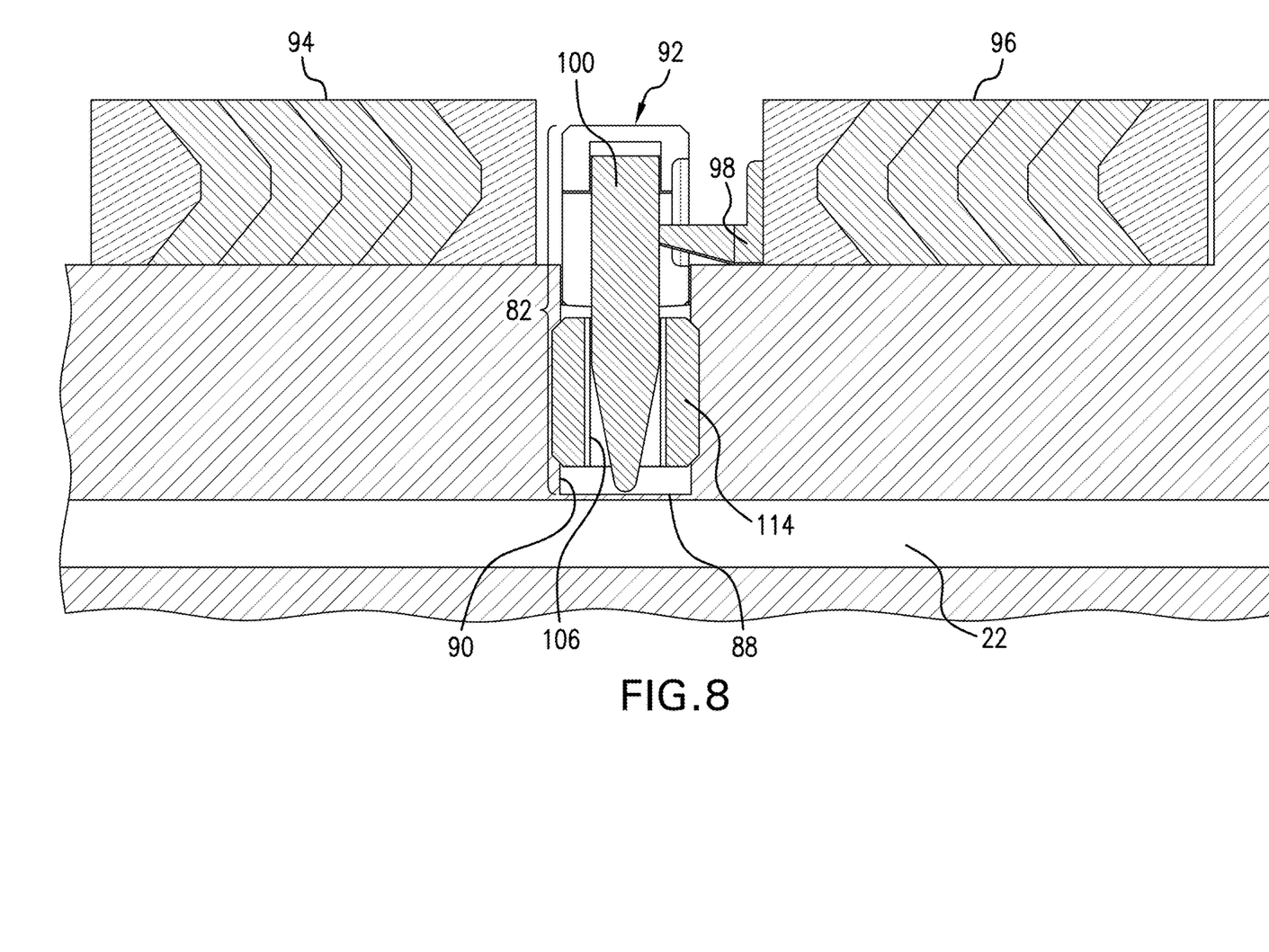
FIG. 8 is a sectional view of another alternate openable arrangement in a closed position.
Figure 9:
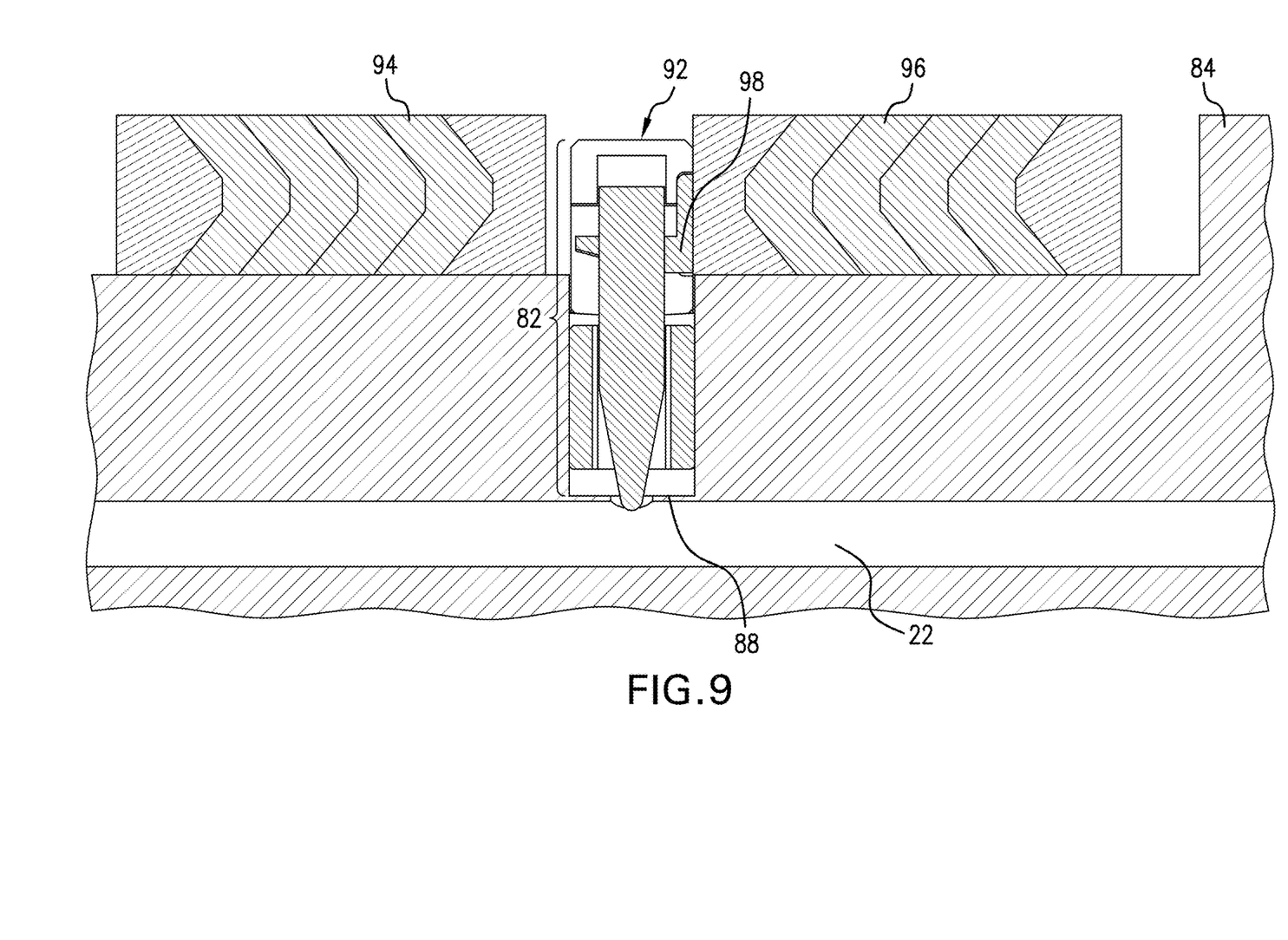
FIG. 9 is a sectional view of the FIG. 8 embodiment in an open position.

Referring to FIGS. 8 and 9 another penetrator assembly 92 only includes a bushing 114, the penetrator 100, and the mobilizer 98. The difference in the FIG. 6 and FIG. 8 embodiments, is the portion 88 that maintains the seal between chamber 22 and the exterior environment outside of housing 84. No other seals are needed and hence the disk 86 and disk cartridge 102 are absent. It is noted that the bushing 114 includes the channels 106 for fluid flow when the portion 88 is opened. Further, it is to be understood that while not illustrated in FIGS. 8 and 9, the penetrator 100 in this embodiment may include the passage 108 (which would appear identically to that shown in FIGS. 6 and 7). The penetrator 100 may be spike shaped or blade shaped as desired to ensure the penetrator effectively cuts through the portion 88. In other respects the embodiment of FIGS. 8 and 9 works the same way that the embodiment of FIGS. 6 and 7 works.

Figure 11:
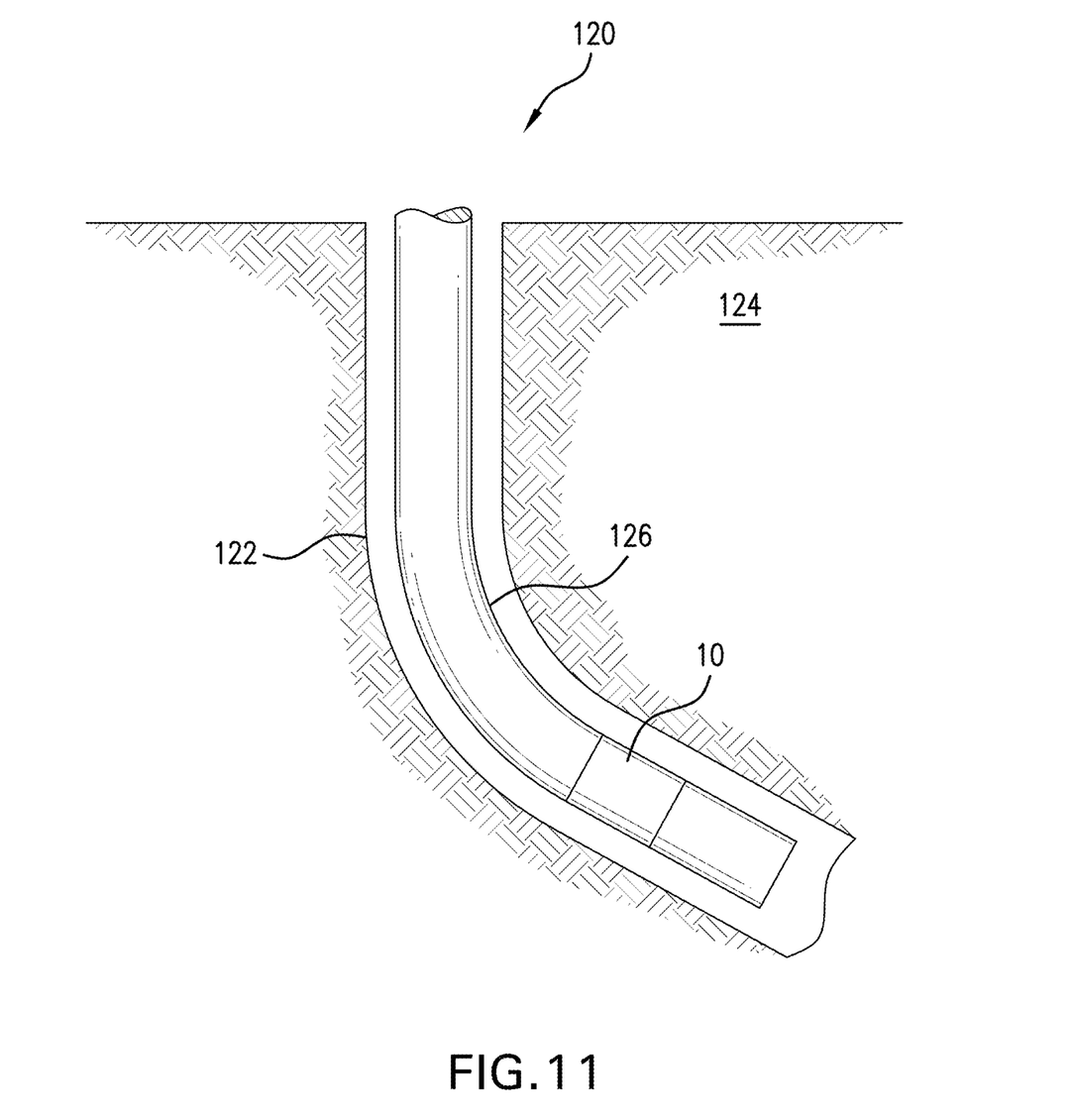
FIG. 11 is a view of a borehole system including the insert valve as disclosed herein.

Referring to FIG. 11, a borehole system 120 is illustrated. The system 120 comprises a borehole 122 in a subsurface formation 124. A string 126 is disposed within the borehole 122, An insert safety valve 10 as disclosed herein is disposed within or as a part of the string 126.

Set forth below are some embodiments of the foregoing disclosure:

Embodiment 1: An insert safety valve, including a housing, a seal element disposed upon the housing, a flow tube movably disposed within the housing, a flapper articulated to the housing and responsive to positions of the flow tube relative to the housing, an atmospheric chamber disposed within the housing, a selectively openable boundary, an opener disposed to selectively open the openable arrangement to allow pressure communication between the atmospheric chamber and an environment outside of the housing, the opener being responsive to movement of the seal element on the housing.

Embodiment 2: The safety valve as in any prior embodiment, further comprising a penetrator.

Embodiment 3: The safety valve as in any prior embodiment, wherein the penetrator assembly defines a passage therein.

Embodiment 4: The safety valve as in any prior embodiment, wherein the selectively openable boundary includes a disk cartridge and a disk.

Embodiment 5: The safety valve as in any prior embodiment, wherein the selectively openable boundary includes a recess and a portion of the housing separating the recess from the atmospheric a chamber within the housing.

Embodiment 6: The safety valve as in any prior embodiment, wherein the selectively openable boundary includes a valve member.

Embodiment 7: The safety valve as in any prior embodiment, wherein the valve member includes a biaser.

Embodiment 8: The safety valve as in any prior embodiment, wherein the valve member moves radially inwardly or radially outwardly relative to the housing.

Embodiment 9: The safety valve as in any prior embodiment, wherein the opener is responsive to pressure input.

Embodiment 10: The safety valve as in any prior embodiment, wherein the opener is responsive to a mechanical input.

Embodiment 11: The safety valve as in any prior embodiment, wherein the mechanical input is by a seal element, the seal element being movable based upon application of pressure.

Embodiment 12: The safety valve as in any prior embodiment, wherein the pressure is applied from a control location.

Embodiment 13: The safety valve as in any prior embodiment, wherein the housing further defines a bore for the flow tube that is offset from an axial centerline of the housing.

Embodiment 14: A borehole system, including a preexisting downhole structure having a control line, an insert safety valve as in any prior embodiment, disposed within the preexisting downhole structure, the insert safety valve configured to operate based upon input from the control line.

Embodiment 15: The borehole system as in any prior embodiment, wherein movement of the seal element relative to the housing is by application of pressure from the control line.

Embodiment 16: A method for controlling a wellbore, including running the insert safety valve as in any prior embodiment to a location in a wellbore, preventing fluid communication with the atmospheric chamber of the safety valve during running, landing the insert safety valve, moving the opener, and enabling fluid communication with the atmospheric chamber.

Embodiment 17: The method as in any prior embodiment, wherein the moving of the opener is by moving the seal element disposed on the housing adjacent the opener.

Embodiment 18: The method as in any prior embodiment, wherein the moving the opener includes physically moving at least a part of the selectively openable boundary with the opener.

Embodiment 19: The method as in any prior embodiment, wherein the physically moving includes wedging.

Embodiment 20: A wellbore system, including a borehole in a subsurface formation, a string in the borehole, and an insert safety valve as in any prior embodiment, disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% of a given value.

The teachings of the present disclosure may be used in a variety of well operations. These operations may involve using one or more treatment agents to treat a formation, the fluids resident in a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An insert safety valve, comprising:
    a housing;
    a seal element disposed upon the housing;
    a flow tube movably disposed within the housing;
    a flapper articulated to the housing and responsive to positions of the flow tube relative to the housing;
    an atmospheric chamber disposed within the housing;
    a selectively openable boundary;
    an opener disposed to selectively open the selectively openable boundary to allow pressure communication between the atmospheric chamber and an environment outside of the housing, the opener being responsive to movement of the seal element on the housing.

2. The safety valve as claimed in claim 1, further comprising a penetrator.

3. The safety valve as claimed in claim 2, wherein the penetrator defines a passage therein.

4. The safety valve as claimed in claim 1, wherein the selectively openable boundary includes a disk cartridge and a disk.

5. The safety valve as claimed in claim 1, wherein the selectively openable boundary includes a recess and a portion of the housing separating the recess from the atmospheric chamber within the housing.

6. The safety valve as claimed in claim 1, wherein the selectively openable boundary includes a valve member.

7. The safety valve as claimed in claim 6, wherein the valve member includes a biaser.

8. The safety valve as claimed in claim 6, wherein the valve member moves radially inwardly or radially outwardly relative to the housing.

9. The safety valve as claimed in claim 1, wherein the opener is responsive to pressure input.

10. The safety valve as claimed in claim 1, wherein the opener is responsive to a mechanical input.

11. The safety valve as claimed in claim 10, wherein the mechanical input is by the seal element, the seal element being movable based upon application of pressure.

12. The safety valve as claimed in claim 11, wherein the pressure is applied from a control location.

13. The safety valve as claimed in claim 1, wherein the housing further defines a bore for the flow tube that is offset from an axial centerline of the housing.

14. A borehole system, comprising:
    a preexisting downhole structure having a control line;
    an insert safety valve as claimed in claim 1, disposed within the preexisting downhole structure, the insert safety valve configured to operate based upon input from the control line.

15. The borehole system as claimed in claim 14, wherein movement of the seal element relative to the housing is by application of pressure from the control line.

16. A method for controlling a wellbore, comprising:
    running the insert safety valve as claimed in claim 1 to a location in a wellbore;
    preventing fluid communication with the atmospheric chamber of the safety valve during running;
    landing the insert safety valve;
    moving the opener; and
    enabling fluid communication with the atmospheric chamber.

17. The method as claimed in claim 16, wherein the moving of the opener is by moving the seal element disposed on the housing adjacent the opener.

18. The method as claimed in claim 16, wherein the moving the opener includes physically moving at least a part of the selectively openable boundary with the opener.

19. The method as claimed in claim 18, wherein the physically moving includes wedging.

20. A wellbore system, comprising:
    a borehole in a subsurface formation;
    a string in the borehole; and
    an insert safety valve as claimed in claim 1, disposed within or as a part of the string.

* * * * *